Nov. 22, 1938.   R. F. WHITNEY   2,137,372
WORK TREATING ROLL
Filed Nov. 27, 1936
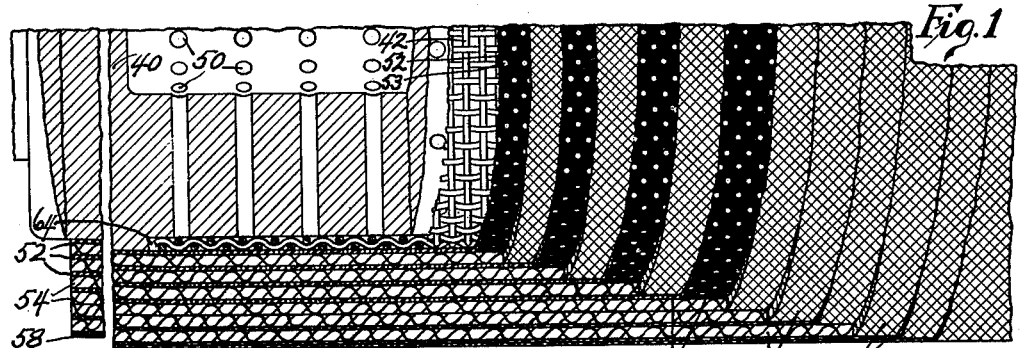
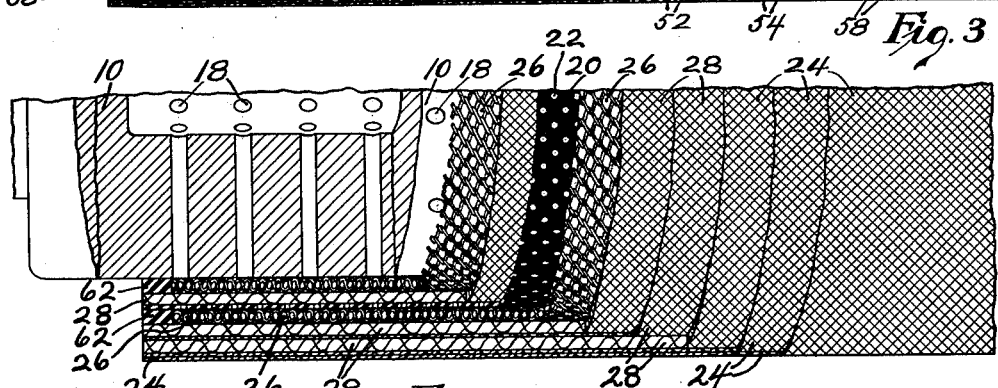
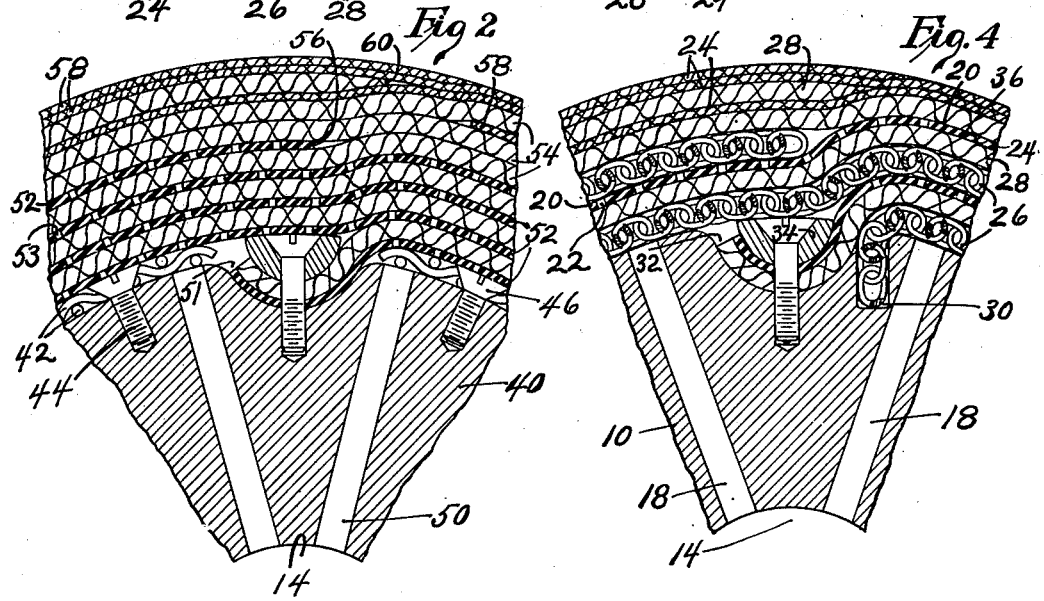
Inventor
Robert F. Whitney
By his attorney
Victor Call Patented Nov. 22, 1938

2,137,372

UNITED STATES PATENT OFFICE 2,137,372

WORK TREATING ROLL

Robert F. Whitney, Winchester, Mass., assignor to The Turner Tanning Machinery Company, Portland, Maine, a corporation of Maine Application November 27, 1936, Serial No. 112,911

7 Claims. (Cl. 149—14).

This invention relates to machines for operating upon hides, skins and leather. While the invention is illustrated as embodied in a work treating roll designed particularly for use in putting-out and wringing operations upon hides and skins, it will be understood that the invention and various important features thereof may have other applications and uses.

As heretofore constructed, work treating rolls in putting-out and wringing machines have commonly consisted of a metal cylinder having a yielding rubber layer for the accommodation of pieces of work varying substantially in thickness in different portions thereof, and also an absorptive surface layer of felt or of burlap, or both, to take moisture from the hides or skins being operated upon. The felt or burlap layer of such rolls soon becomes soaked with moisture and with other material so that their efficiency quickly becomes greatly reduced.

It is an object of this invention to provide an improved work treating roll which will tend constantly to maintain its efficiency during the treatment of successive pieces of work where water or watery products are removed therefrom.

To these ends and in accordance with an important feature of the invention there is provided a rigid supporting cylinder having an interior chamber and numerous channels through which liquid may be withdrawn under suction from the surface of the cylinder. This cylinder is covered with a foraminous substantially non-compressible or non-deformable layer of material to insure that the openings of the channels on the surface of the cylinder will be kept unobstructed for the most efficient removal of water from the pieces of work. This layer, in turn is preferably covered with a compressible layer of resilient material so that variations in the thickness of the work pieces may be readily accommodated. Conveniently, the non-deformable layer is a foraminous metallic layer which may be either a woven wire fabric or a chain or link fabric. In either case this layer permits the ready passage of liquid material to the openings of the channels on the surface of the metal cylinder while at the same time preventing any obstruction of these openings.

In the illustrated rolls, the yielding layer comprises a perforated sheet of rubber wound a number of times about the cylinder outside of the foraminous metallic layer, the perforations of the sheet rubber being for the purpose of permitting liquid material to pass readily from the surface of the roll to the channels in the cylinder under the force of suction provided by any suitable means such as a pump. To provide an efficient absorptive layer there is wound about the roll a substantial length of a rather closely woven textile fabric or an equivalent felted fabric, the arrangement being preferably such that this fabric layer and the sheet rubber layer are wound together in such manner that the fabric layer furnishes a support for the greater part of the sheet rubber layer. On the exterior surface of the roll there are a number of layers of finer fabric to serve as an absorptive surface and one that may be readily removed and discarded when worn.

These and other important features of the invention and novel combinations of parts will now be described in detail in the specification and then pointed out more particularly in the appended claims.

In the drawing,

Fig. 1 is a longitudinal sectional view of a part of a work treating roll showing one embodiment of the invention;

Fig. 2 is a transverse sectional view of part of the roll shown in Fig. 1, showing particularly the covering layers of the roll;

Fig. 3 is a view similar to Fig. 1 illustrating another embodiment of the invention; and Fig. 4 is a transverse sectional view of a part of the roll shown in Fig. 3.

In a preferred embodiment of the invention, which is particularly designed as a suction roll for use in putting-out and wringing operations upon hides and skins, there is provided a metal cylinder 10 (Figs. 3 and 4) having a cylindrical bore 14.

As clearly indicated in Figs. 3 and 4, the bore 14 of the cylinder 10 is connected to the peripheral surface of the cylinder by a large number of channels 18 which may be drilled or otherwise formed in the shell of the cylinder 10. As indicated in Fig. 3, the openings of the channels 18 are regularly dispersed throughout the surface of the cylinder 10 to open into the bore 14, thus providing numerous passageways through which moisture may be drawn from the cylindrical surface of the cylinder 10 to the bore 14 for eventual discharge by a suction means (not shown).

Through long experience tanners prefer to cover work treating rolls of the type under consideration with a rubber layer to afford a yielding support for the work whereby variations in thickness of the hides or skins are readily accommodated, the rubber layer being in turn covered with a number of layers of burlap or other absorbent fabric to afford better traction in feeding the hides or skins and to effect removal of moisture by absorption from the hides or skins during putting-out or wringing operations. Accordingly, I have retained these materials or their equivalents, and in the illustrated construction (Figs. 3 and 4) I have utilized a special rubber layer 20 which is provided with numerous perforations 22. Absorbent fabric layers are indicated at 24 on the exterior surface of the roll. In addition to these layers, I have found it advantageous to provide a substantially non-deformable foraminous layer on the surface of the cylinder 10 so that the channels 18 will always remain unobstructed even at those points where the greatest pressure on the work is taking place. Conveniently the non-deformable layer in Figs. 3 and 4 is provided by a metallic chain or link fabric 26 wrapped one or more times around the cylindrical surface of the cylinder 10. Covering the chain fabric 26 is a relatively heavy layer 28 of a textile fabric, organic in origin, preferably of either cotton or wool or a mixture of the two, and readily penetrable by moisture.

Upon reference to Fig. 4 it will be observed that the metallic layer 26 has its inner end secured to the cylinder 10 by being pushed down into a slot 30 of such a depth and at such an angle to the circumference of the cylinder that there is a distinct tendency to hold the metallic layer 26 against displacement in the direction of the circumference of the roll. Adjacent to the slot 30 there is provided a suitable groove 32 for the reception of the corresponding ends of the rubber and fabric layers 20, 28, together with a slat 34 tightly secured in place by screws. With the ends of the layers 20, 26 and 28 thus secured to the cylinder 2, the said layers are then wrapped about the cylinder, the length of the metallic layer 26 being preferably such as to make two complete turns about the cylinder 10. Preferably, also, the rubber layer 20 is substantially shorter than the fabric layer 28 so that it ends at a point 36 (Fig. 4), the purpose being to afford ample anchorage for the lighter fabric layers 24 by having the first layer thereof start substantially at the point 36, by which a very considerable part of the first turn of the lighter fabric layer is covered by the final turn or wrap of the heavier textile layer 28, the lighter layer being then continued for two or more turns or wraps about the external surface of the fabricated roll. It will be readily understood that the lighter fabric layers 24 are thus held or anchored securely in place through frictional engagement between said lighter fabric layers and the last turn or wrap of the heavier textile layer 28. It is perhaps needless to say that all of the layers 20, 24, 26 and 28 are wrapped about the roll in a direction the reverse of the direction of rotation of the roll so that, during treatment of the work by the usual bladed cylinder of a wringing or putting-out machine, the tendency is to extend the layers in the direction of the wrap thereof, thus keeping them tightly in position on the roll.

In another preferred embodiment of the invention, disclosed in Figs. 1 and 2 of the drawing, a cylinder 40 is constructed substantially the same as cylinder 10 and is connected to a suction pump (not shown) in a similar way. However, the substantially non-deformable layer, directly covering the cylinder 40, is a woven wire fabric 42 which may be termed a fine-mesh wire screen that is for all practical purposes incompressible. This layer 42 is secured at its ends to the cylinder 40 by two rows of screws 44 and 46 (Fig. 2), there being but one turn or wrap of the woven wire fabric about the roll 40. If desired, and to permit ready removal and cleaning of the metallic screen 42, the latter may be divided into two parts each covering substantially one-half of the surface of the cylinder and being secured along each of its parallel edges by rows of screws. The cylinder 40 is also provided with channels 50, and with a groove 51 for the reception of the initial ends of a layer of rubber 52, having multiple perforations 53, and a layer of textile fabric 54, these latter two layers being wrapped around the cylinder 40 a substantial number of turns. Conveniently the rubber layer 52 ends with the fourth turn or wrap about the cylinder at the point 56 (Fig. 2), while the fabric layer 54 is continued for another turn or wrap or several of these latter. Then a burlap layer or other light absorbent fabric 58 begins and is wound about the roll under the last wrap or wraps of the heavier textile layer 54 so as to be held firmly in place by the latter, the lighter fabric layer continuing for two wraps or turns about the roll beyond the end 60 of the textile layer 54.

It is to be understood that it will be necessary to replace the light outer fabric layers 58 from time to time when the wringing or putting-out machine is in active use. This may be readily done simply by unwinding the layers 58 from the roll, along with the last wrap or turn of the heavier layer 54. Then a new layer or layers of the lighter fabric may be wound with the last wrap or turn of the heavier textile layer 54.

It will be noted that one difference between the two preferred embodiments of the invention illustrated in the drawing resides in the use, in the roll of Figs. 1 and 2, of a wire screen 42 as the metallic foraminous layer while, in the roll of Figs. 3 and 4, the foraminous layer is provided by using a metallic chain or link fabric 26. While both of these metallic fabrics are substantially non-deformable, so as to insure that the ends of the channels (18 and 50) will remain unobstructed during the life of the roll, the chain or link fabric is somewhat compressible. In fact, the rubber layer may be omitted if two or more layers of the metallic fabric 26 be employed in the roll intended for certain uses, as for instance, in putting-out or wringing operations upon splits, which are fairly even in thickness and therefore do not require so much yield in the roll as do hides and skins.

The ends of the chain fabric will be sealed against leakage of air or water by a plastic composition, such as rubber, molded into such end or edge portions of the metal fabric as indicated at 62 in Fig. 3. The wire screen is thinner and is not so likely to leak. It may, however, be sealed in the same way as the chain fabric or it may be set against a shoulder as at 64 in Fig. 1.

The chain or link fabric, and not the wire screen, will be used where it is desired to have several layers of the metallic fabric wound with other fabrics about the roll, since the chain fabric is flexible in all directions and will bend without any tendency to permanent deformity, which is not true of the wire screen.

It is to be understood that the described suction roll will ordinarily be used as a combined bed roll and feed roll in wringing and putting-out machines. In other words, a hide or skin is placed over the suction roll serving as a work support in a putting-out machine while a bladed cylinder operates on the hide or skin under considerable pressure to spread this hide or skin out laterally, that is, in directions along the longitudinal axis of the bed roll. At the same time the bladed cylinder presses watery material from the hide or skin, considerable quantities of the moisture being taken up by the bed roll and being constantly withdrawn from said roll through the described layers by the action of the suction means including the pump (not shown). The suction roll also works effectively in wringing machines in the removal of moisture from hides and skins and particularly from sheepskins tanned with the wool in place.

Having described my invention, what I claim as new and desire to secure by Letters Patent of the United States is:

1. A work treating roll to remove moisture from pieces of work comprising a hollow cylinder having numerous channels extending from the surface to the interior of the cylinder, a foraminous metallic layer covering the surface of the cylinder, and a perforate sheet of rubber and one or more sheets of absorptive material wound together to serve as a covering for the said metallic layer, the sheet or sheets of absorptive material having portions interposed between adjacent layers of the wound rubber sheet thus providing for passage of moisture from one layer of rubber to another and through perforations in said rubber layers, said absorptive material being longer than the rubber sheet to provide an absorbent layer exterior to the outermost rubber layer for contact with the work piece from which moisture is to be expressed.

2. A work treating roll comprising a hollow cylinder having numerous channels extending from the surface thereof to the interior of the cylinder, a metal chain fabric constituting the first layer covering the cylindrical surface of said cylinder, a layer of absorbent textile material readily penetrable by water and covering the chain layer, a perforate rubber layer covering the textile layer, and a layer of absorptive material to take up watery material removed from the work piece.

3. A suction roll comprising a hollow cylinder having numerous channels extending from the cylindrical surface thereof to the interior of the cylinder, said cylinder having a slot extending through its exterior surface and at an acute angle thereto, said cylinder having also a groove in its surface adjacent to said slot, a flexible foraminous metallic layer serving as the first covering layer on said cylindrical surface and having an end portion inserted in said slot, and foraminous rubber and absorbent textile layers overlying each other and having their initial ends secured together in said groove, at least one textile layer being arranged in contact with the metallic layer, all three of said layers being wrapped or wound around said cylinder with a textile layer between superposed rubber layers, the length of the metallic and rubber layers being less than that of the textile layer whereby the latter presents a portion sufficient to provide a complete wrap around the roll beyond said metallic and rubber layers, the textile layer being penetrable by moisture, and the arrangement being such that said moisture passes readily through all three layers to the interior of the cylinder upon the application of suction thereto.

4. A suction roll comprising a hollow cylinder having numerous channels extending from the cylindrical surface thereof to the interior of the cylinder, said cylinder having a slot extending through its cylindrical surface and at an acute angle thereto, said cylinder having also a groove in its cylindrical surface adjacent to said slot, a metallic chain fabric layer serving as the first covering layer on said cylindrical surface and having an end portion inserted in said slot, foraminous rubber and absorbent textile layers overlying each other, with the textile layer in contact with the metallic layer, and having their initial ends secured together in said groove, all three of said layers being wrapped or wound around said cylinder with a textile layer between superposed rubber layers, the length of the metallic and rubber layers being less than that of the textile layer whereby the latter presents a portion sufficient to provide a complete wrap around the roll beyond said metallic and rubber layers, the textile layer being penetrable by moisture, the arrangement being such that moisture readily passes through all three layers to the interior of the cylinder upon the application of suction thereto, and a layer of light absorbent fabric having a portion arranged to be overlapped by the last wrap of the textile layer, the said light fabric extended to make several complete turns or layers on the surface of the roll to serve as an absorptive layer to contact the work pieces.

5. A suction roll comprising a hollow cylinder having numerous channels extending from the surface thereof to the interior of the cylinder, said cylinder having a groove in its cylindrical surface extending lengthwise of the cylinder, a foraminous metallic layer disposed upon the cylindrical surface of the cylinder over the openings of said channels, and foraminous rubber and absorbent textile layers overlying each other and having their initial ends secured together in said groove, said rubber and textile layers being wrapped or wound around said cylinder, the length of the rubber layer being less than that of the textile layer whereby the latter presents a portion sufficient to provide a complete wrap around the roll beyond said rubber layer, the textile layer being penetrable by moisture, and the arrangement being such that said moisture readily passes through all three layers to the interior of the cylinder upon the application of suction thereto.

6. A work treating roll comprising a hollow cylinder having numerous channels extending from the surface thereof to the interior of the cylinder, a metal chain fabric constituting the first layer covering the cylindrical surface of said cylinder, layers of absorbent sheet material upon the exterior surface of the roll to take up watery material expressed from a work piece, and other layers of both metal chain fabric and absorbent sheet material wound together over the first layer of the chain fabric on the surface of the cylinder.

7. A work treating roll comprising a hollow cylinder having numerous channels extending from the surface thereof to the interior of the cylinder, a metal chain fabric constituting the first layer covering the cylindrical surface of said cylinder, said chain fabric having its edge portions adjacent to the ends of the roll provided with plastic material to seal said edges of the chain fabric to prevent the entrance or exit of air or watery material, and layers of absorbent sheet material upon the exterior surface of the roll to take up watery material expressed from a work piece.

ROBERT F. WHITNEY.